(12) United States Patent
Riley et al.

(10) Patent No.: US 10,000,644 B2
(45) Date of Patent: Jun. 19, 2018

(54) CONDUCTIVE WATER BORNE COATINGS AND METHODS FOR ENHANCING COATING CONDUCTIVITY

(71) Applicant: THE BOEING COMPANY, Chicago, IL (US)

(72) Inventors: Terrell D. Riley, Summerville, SC (US); Alexandra E. Corona, Summerville, SC (US); Christopher Lamar Broadbent, Covington, WA (US); Shahnaz Shokri, Bellevue, WA (US); Quynhgiao Nguyen Le, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 23 days.

(21) Appl. No.: 15/187,147

(22) Filed: Jun. 20, 2016

(65) Prior Publication Data
US 2016/0304729 A1     Oct. 20, 2016

Related U.S. Application Data

(62) Division of application No. 13/934,862, filed on Jul. 3, 2013, now Pat. No. 9,401,232.

(51) Int. Cl.
| | |
|---|---|
| *H01B 1/00* | (2006.01) |
| *C09D 5/24* | (2006.01) |
| *H01B 1/22* | (2006.01) |
| *B05D 5/12* | (2006.01) |
| *C09D 175/04* | (2006.01) |
| *C08K 3/10* | (2018.01) |

(Continued)

(52) U.S. Cl.
CPC ............... *C09D 5/24* (2013.01); *B05D 5/12* (2013.01); *B60R 16/06* (2013.01); *B64D 45/02* (2013.01); *C08K 3/10* (2013.01); *C08L 81/08* (2013.01); *C09D 175/04* (2013.01); *H01B 1/22* (2013.01); *C08K 2201/001* (2013.01); *C08K 2201/011* (2013.01)

(58) Field of Classification Search
CPC . H01B 1/00; H01B 1/127; H01B 1/22; C08D 5/24
See application file for complete search history.

(56) References Cited

U.S. PATENT DOCUMENTS

| | | |
|---|---|---|
| 7,960,027 B2 | 6/2011 | Guiheen |
| 2010/0255323 A1 | 10/2010 | Nakamura |

(Continued)

FOREIGN PATENT DOCUMENTS

CN      106700961 A  *  5/2017

OTHER PUBLICATIONS

Caneba et al., "Novel Ultrasonic Dispersion of Carbon Nanotubes," Copyright 2010, Journal of Minerals & Materials Characterization & Engineering, vol. 9, pp. 165-181, 17 pages.

(Continued)

*Primary Examiner* — Mark Kopec
(74) *Attorney, Agent, or Firm* — Coats & Bennett, PLLC

(57) ABSTRACT

The present disclosure is directed to conductive, translucent water-borne conductive coatings comprising a water-borne lubricant coating base material, an amount of PEDOT:PSS solution, and an amount of metal-containing nanowire, methods for making the same, and articles coated with such coatings.

20 Claims, 1 Drawing Sheet

(51) Int. Cl.
*C08L 81/08* (2006.01)
*B60R 16/06* (2006.01)
*B64D 45/02* (2006.01)

(56) References Cited

U.S. PATENT DOCUMENTS

| | | | |
|---|---|---|---|
| 2010/0270055 A1* | 10/2010 | Zheng | C08G 18/10 |
| | | | 174/126.1 |
| 2011/0052926 A1 | 3/2011 | Nakamura | |
| 2012/0104374 A1* | 5/2012 | Allemand | H01B 1/02 |
| | | | 257/40 |
| 2017/0198155 A1* | 7/2017 | Lovenich | C09D 5/24 |

OTHER PUBLICATIONS

Webpage Base Metals Definition; from http://web.archive.org/web/20101113034257/http://www.investopedia.com/terms/b/base- . . . ; pp. 1-2; Aug. 26, 2015.

* cited by examiner

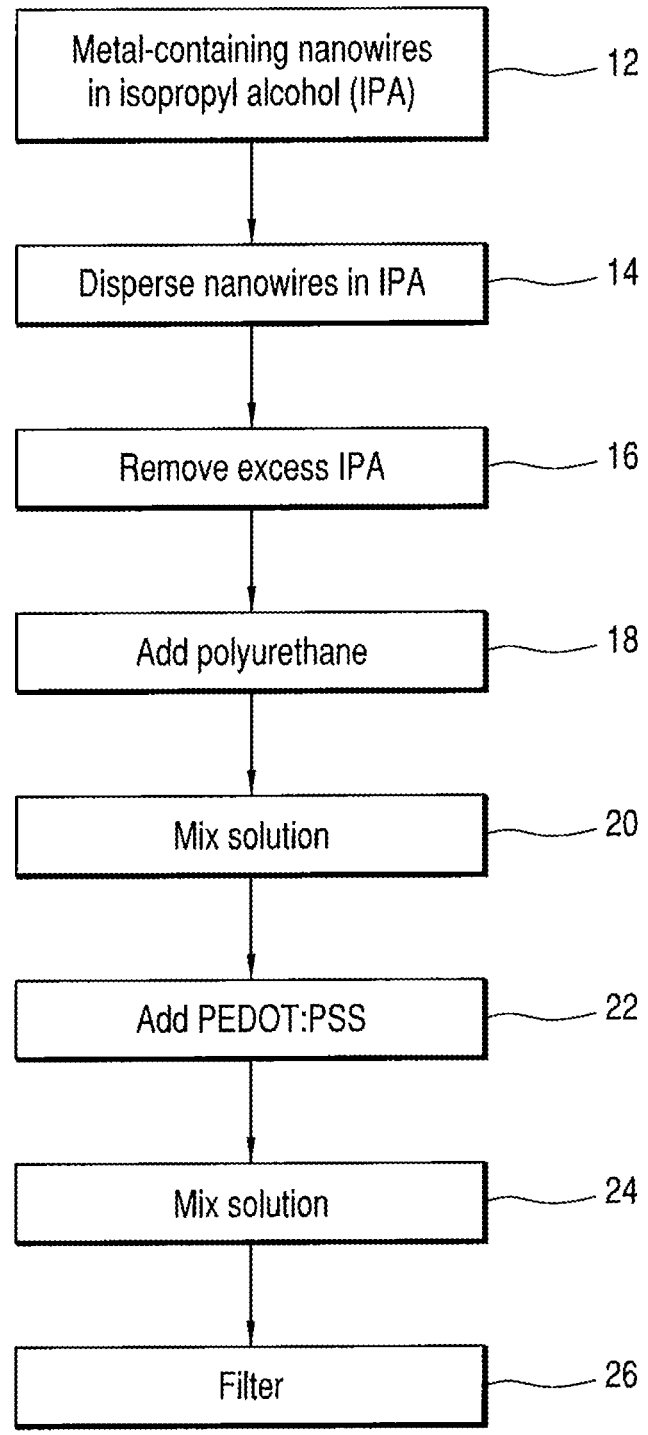

CONDUCTIVE WATER BORNE COATINGS AND METHODS FOR ENHANCING COATING CONDUCTIVITY

CROSS-REFERENCE

The present application is a divisional application of U.S. utility application Ser. No. 13/934,862, filed Jul. 3, 2013, entitled "CONDUCTIVE WATER BORNE COATINGS AND METHODS FOR ENHANCING COATING CONDUCTIVITY", now U.S. Pat. No. 9,401,232.

TECHNOLOGICAL FIELD

The present disclosure is directed generally to the field of water-borne coatings and their methods of manufacture. More specifically, the present disclosure is directed to translucent water-borne conductive lubricant coatings.

BACKGROUND

As the field and utility of non-conductive composite materials has increased, so has the need for identifying suitable conductive lubricants and coatings that can be easily and substantially permanently applied to such materials, while lending conductive characteristics to non- or marginally-conductive substrates, such as, for example, composite substrate materials.

Composite materials ("composites") are understood to be materials from two or more constituent materials having different physical or chemical properties that join to produce a material with characteristics different from the characteristics of the individual constituent materials. Composites include composite building materials, reinforced plastics, metal composites, ceramic composites, etc.

Fiber-reinforced composite materials have been used in high-performance products that are lightweight, yet strong enough to sustain harsh loading conditions, such as, for example, aircraft, spacecraft, nautical vehicles, racing automobiles, etc. Carbon composite is an important composite material gaining recognized usefulness for aircraft structures, spacecraft structures, terrestrial and aquatic vehicles, heat shields, solar panels, satellites, antenna reflectors, etc. While composite materials are often desirable for their strength, and while such materials may desirably be non-conductive or electrically insulative, certain applications could benefit from an increased material conductivity. However, known attempts to improve material conductivity have comprised materials that, while conductive, are opaque and therefore not well-suited for use in a topcoat, as the overall appearance of the topcoat is altered by the incorporation of the conductive material.

BRIEF SUMMARY

The present disclosure is directed to translucent conductive coatings comprising a water-borne lubricant coating base material, an amount of conductive polymer, and an amount of metal-containing nanowire. Preferably, the present disclosure is directed to translucent conductive coatings comprising a water-borne polyurethane lubricant coating, an amount of PEDOT:PSS solution, and an amount of metal-containing nanowires.

According to one variation, the present disclosure is directed to a method for enhancing the conductivity of a substantially non-conductive surface, comprising the steps of providing a substrate having a substantially non-conductive surface, preparing a translucent material comprising an amount of water-borne polyurethane coating with an amount of PEDOT:PSS solution and an amount of metal-containing nanowires, and applying the translucent coating to the substrate surface. The metal-containing nanowires are preferably copper-containing nanowires, silver-containing nanowires or combinations thereof. More preferably, the metal-containing nanowires are copper-containing nanowires such as, for example, copper-nickel nanowires. For the purpose of this disclosure, non-conductive surfaces are understood to be those having a sheet resistance of about $10^{10}$ ohms/square or greater.

The disclosure is further directed to a method for making a translucent conductive coating comprising the steps of dispensing an amount of metal-containing nanowires in an isopropyl alcohol solution to a container and mixing the nanowires in solution, preferably by sonicating the nanowires. Excess isopropyl alcohol is removed from the container, and an amount of water-borne polyurethane coating is added to the container with the nanowires. The contents of the container are mixed, preferably by double-ultrasonicating the contents, followed by adding an amount of PEDOT:PSS solution to the container to obtain a mixture. The mixture is then further mixed, preferably by double-ultrasonicating the mixture, followed by filtering.

According to a preferred variation, the water-borne polyurethane coating is Emralon 8301, and is added to coating mixture in an amount of from about 65 to about 85 weight percent. The PEDOT:PSS solution is added in an amount of from about 15 to about 35 weight percent. Finally, the metal-containing nanowires are added to the mixture in an amount of preferably from about 0.1 to about 0.5 weight percent. Preferably, the metal-containing nanowires are silver-containing or copper-containing nanowires. Most preferably, the nanowires are copper-nickel nanowires.

The present disclosure is further directed to a translucent conductive coating material comprising an amount of water-borne polyurethane coating, an amount of PEDOT:PSS solution, and an amount of metal-containing nanowires. The coating preferably comprises a sheet resistance of from about $10^3$ to about $10^6$ ohms/square.

The preferred coatings provide lubricity, are substantially transparent and provide enhanced conductivity for substantially non-conductive surfaces where properties such as, for example, electrostatic dissipation or conductive continuity are required. Further, the coatings of the present disclosure exhibit reduced electrical resistance characteristics, as compared to a coating made only with either (and only one) of the two additives: PEDOT:PSS solution or copper-nickel nanowires.

BRIEF DESCRIPTION OF THE DRAWING

Having thus described variations of the disclosure in general terms, reference will now be made to the accompanying drawing, wherein:

FIG. 1 is a flowchart outlining one method for making a preferred translucent conductive coating according to the present disclosure.

DETAILED DESCRIPTION

Poly(3,4-ethylenedioxythiophene) poly (styrenesulfonate), also known as "PEDOT:PSS", is a polymer mixture of two ionomers. One component in this mixture comprises sodium polystyrene sulfonate (a sulfonated polystyrene). A portion of the PSS sulfonyl groups is deprotonated and carries a negative charge. The other component, poly(3,4-ethylenedioxythiophene), or, PEDOT is a conjugated polymer that has a net positive charge and is based on polythiophene.

The present disclosure preferably contemplates combining a water-borne polyurethane and an amount of PEDOT:PSS solution with an amount of metal-containing nanowires in a preferred ratio of from about 65 to 85 weight percent water-borne polyurethane coating; from about 15 to about 35 weight percent PEDOT:PSS solution, and preferably from about 0.1 to about 0.5 weight percent metal-containing nanowires. The resultant coating has a sheet resistance of from about $10^3$ to about $10^6$ ohms/square.

According to a preferred variation, the coatings of the present disclosure comprise a water-borne polyurethane coating in an amount of from about 65 to 85 weight percent; PEDOT:PSS solution in an amount of from about 15 to about 35 weight percent; and copper-nickel nanowires in an amount of preferably from about 0.1 to about 0.5 weight percent. Preferably, the resultant coating has a sheet resistance of about $10^3$ to about $10^6$ ohms/square.

The resulting water-borne conductive coating remains substantially translucent and static dissipative, and can be used as a topcoat. The resulting coating also exhibits a greater capacity for electrical dissipation and conductive continuity than that of a coating using only one of the two conductive additives (PEDOT:PSS or copper-nickel nanowires).

A preferred method for making the coatings of the present disclosure is set forth in the flowchart presented as FIG. 1. According to the preferred process 10, metal-containing nanowires in isopropyl alcohol (IPA) 12 are dispersed 14, preferably by sonicating the metal-containing nanowires in IPA, followed by the removal of excess IPA 16. Polyurethane is added 18 to the metal-containing nanowires to make a mixture that is then mixed 20, preferably by double-ultrasonicating the mixture. An amount of PEDOT:PSS is added 22 followed by further mixing 24, preferably by double-ultrasonicating the mixture. The mixture is then filtered 26 to obtain the preferred translucent conductive water-borne coating.

The following Example presents a preferred method for making coatings according to the present disclosure. The Example is not meant to in any way restrict the scope of the disclosure, but is provided for illustrative purposes only.

EXAMPLE

Using a Branson B2510MT Ultrasonic Cleaner filled with water, the 1 mg/ml copper-nickel nanowires (40% alloy in isopropyl alcohol-Nanoforge) was sonicated in a bottle for 15 minutes. Using a Fisher Scientific 1-10 ml pipette (supplier item 13 690 034), 1 to 50 ml of copper-nickel nanowires in solution was pipetted out for experiment and deposited in a glass vial. The vial was placed on top of a ceramic magnet that had been conventionally magnetized through its thickness with 22.5 lbs of maximum pull (C8 grade, 6 inch length, 4 inch width, 0.75 inch thickness, Armstrong Magnets Inc. supplier item 31012). After approximately 30 minutes, the copper-nickel nanowires settled to the bottom, with some of the copper-nickel remaining in the supernatant. Excess isopropyl alcohol (IPA) was pipetted off to obtain desired concentration.

An amount of 12 ml of Emralon 8301 polyurethane (Henkel North America) was pipetted into the concentrated copper nickel nanowires (in IPA solution). The vial was then placed in the sonicator water bath. The "horn" of Q-sonica Model Q-700 sonicator with Model CL-334 probe was placed into the Branson sonicator water bath and set to an amplitude of 50. The Branson sonicator was concurrently activated and the solution was double-ultrasonicated for 30 minutes. The vial was then removed from the sonication bath and 4 ml of Clevios PH1000, aqueous PEDOT:PSS solution was pipetted into the solution. The vial was capped and shaken to macroscopically mix the contents. A magnetic stir bar was added to the vial and set to stir at 300-350 rpm with a Corning PC-620D stir-plate for 3+ hours. The solution was then double-ultrasonicated for 15 minutes, followed by filtering the solution through a Gerson mesh filter (60×48) before placing the solution in a 3M Paint Prep. System Mini-Cup and attached to a GTI Devilbiss HVLP spray gun No. 2000 with 30 PSI max inlet pressure, A2 opening. The solution was then sprayed onto glass slides as four cross coats of coating and cured at standard conditions 75° F.+/−5° F. and 50% relative humidity. The coating with no additives had a measured sheet resistance of $10^{13}$ ohms/square and the coating with the additives had a measured sheet resistance of $10^3$ to $10^6$ ohms/square. Sheet resistance measurements were made using a Prostat PRS-801 Resistance System set with PRT-914B and PRF-911 concentric rings. Results of the resistivity data obtained while varying amount of copper-nickel nanowire by weight percent (0.1 and 0.4 weight percent) are presented immediately below in Table 1.

TABLE 1

| PEDOT:PSS | Wt % CuNi (NVC) | Probe Sheet Resistance (Ω/□) |
| --- | --- | --- |
| 25 | 0.1 | 3.60E+08 |
| 25 | 0.4 | 9.80E+03 |

Sonication is understood to be the process by which sound waves propagate into the liquid media resulting in alternating high-pressure (compression) and low-pressure (rarefaction) cycles. During rarefaction, high-intensity sonic waves create small vacuum bubbles or voids in the liquid, which then collapse violently (cavitation) during compression. Ultrasonication is understood to be the method where multiple have waves greater than about 20 kHz, resulting in agitation. Double-ultrasonication involves immersing multiple (typically two) sonication probes in a liquid media to perform the ultrasonication. It is understood that the mixing of the components in solution according to the methods of the present disclosure, including the metal-containing nanowires in solution, are double-ultrasonicated or ultra-sonicated, to keep the nanowires from agglomerating in the mixture.

Translucency of the obtained coatings was investigated by measuring color change as well as measuring transmittance. Color change was measured using a black and white opacity card with BYK Gardner Sphere spectrophotometer. The coated slides were placed over the card, with the white and black area measured. The card was then measured through an uncoated glass slide. Color change was measured in delta E. The closer the value is to "0", the more the measured sample matches the original color. Investigated samples had a measured Delta E of 8 over the white and 2.3 over the black, demonstrating that the coating exhibited a degree of color and was not perfectly clear. However, transmittance investigations resulted in achieving acceptable translucency. Transmittance was measured from the UV range through the visible spectrum to near infrared using a Perkin Elmer Lamda 9 UV/VIS/NIR spectrometer equipped with a six inch Labsphere integrating space. The spectrometer was "zeroed in" prior to performing the measurements (i.e. calibrated to 100% transmittance in air). Testing was performed in the middle of the visible light spectrum. An uncoated glass slide (control) was measured to have a transmittance of 91.6% at 550 nm. The coated glass had a measured transmittance of 86% at 550 nm.

Although the example presented above discusses the use of the translucent conductive coatings and coating systems and methods on vehicles, for example, aircraft, spacecraft, and stationary structures (such as, for example, those requiring protection from incident high energy such as lightning, as well as static dissipation), the apparatuses, systems and methods set forth herein are also contemplated for use with manned or unmanned vehicles or objects of any type, or in any field of operation in a terrestrial and/or non-terrestrial setting. A non-exhaustive list of contemplated vehicles include manned and unmanned aircraft, spacecraft, satellites, terrestrial, non-terrestrial and surface and sub-surface water-borne vehicles, etc.

While the present disclosure primarily relates to increasing the conductivity of translucent water-borne coatings/lubricants, the inclusion of an amount of PEDOT:PSS along with an amount of metal-containing nanowires also has the potential for increasing the conductivity of non-translucent coatings, and also may be useful with non-polyurethane-based coatings/lubricants.

The enhanced conductivity afforded by the methods and coatings of the present disclosure are thought to be useful, such as, for example, relative to efforts to divert or otherwise predictably direct or dissipate incident or built-up electrical energy, such as, for example, electrostatic charge buildup, etc. The enhanced conductivity of the coatings disclosed are further thought to be useful such as, for example, for shielding a structure or surface from incident electromagnetic interference.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof.

We claim:

1. A translucent conductive coating material comprising: an amount of water-borne polyurethane; poly(3,4-ethylenedioxythiophene) poly(styrenesulfonate) solution in an amount of from about 15 to about 35 weight percent; and metal-containing nanowires in an amount from about 0.1 to about 0.5 weight percent.

2. The coating material of claim 1, wherein the polyurethane is added in an amount of from about 65 to about 85 weight percent.

3. The coating material of claim 1 wherein the metal-containing nanowires comprise copper-nickel nanowires.

4. The coating material of claim 1, wherein the coating comprises a sheet resistance of from about $10^3$ to about $10^6$ ohms/square.

5. A vehicle comprising a topcoat comprising the coating material of claim 1.

6. A stationary structure comprising a topcoat comprising the coating material of claim 1.

7. The coating material of claim 1 wherein the metal-containing nanowires comprise: copper-containing nanowires; silver-containing nanowires; or combinations thereof.

8. A method for enhancing the conductivity of a substantially non-conductive surface comprising the step of: applying a translucent conductive coating material to a substantially non-conductive surface, said translucent conductive coating comprising an amount of water-borne polyurethane coating combined with an amount of PEDOT:PSS solution and of metal-containing nanowires, wherein said translucent conductive coating material contains water-borne polyurethane, poly(3,4-ethylenedioxythiophene)poly (styrenesulfonate) solution in an amount of from about 15 to about 35 weight percent; and metal-containing nanowires in an amount from about 0.1 to about 0.5 weight percent.

9. The method of claim 8, wherein the metal-containing nanowires comprise copper-containing nanowires, silver-containing nanowires, or combinations thereof.

10. The method of claim 8, wherein the metal-containing nanowires are copper-nickel-containing nanowires.

11. The method of claim 8, wherein the coating comprises a water-borne polyurethane coating in an amount of from about 65 to about 85 weight percent.

12. The method of claim 8, wherein the coating has a sheet resistance of from about $10^3$ to about $10^6$ ohms/square.

13. A method for making a translucent conductive coating material comprising the steps of:
dispensing an amount of metal-containing nanowires in isopropyl alcohol to a container;
dispersing the nanowires in isopropyl alcohol;
removing excess isopropyl alcohol from the container;
adding an amount of water-borne polyurethane coating to the container with the nanowires;
mixing the contents of the container;
adding an amount of poly(3,4-ethylenedioxythiophene) poly(styrenesulfonate) solution to the container to obtain a mixture;
mixing the contents of the container; and
filtering the mixture, wherein said translucent conductive coating material contains water-borne polyurethane, poly(3,4-ethylenedioxythiophene) poly(styrenesulfonate) solution in an amount of from about 15 to about 35 weight percent; and metal-containing nanowires in an amount from about 0.1 to about 0.5 weight percent.

14. The method of claim 13, wherein, in the step of dispensing metal-containing nanowires, the metal-containing nanowires comprise copper-containing nanowires; silver-containing nanowires; or combinations thereof.

15. The method of claim 13, wherein, in the step of dispensing metal-containing nanowires, the metal-containing nanowires comprise copper-nickel nanowires.

16. The method of claim 13, wherein, in the step of adding an amount of water-borne polyurethane coating to the container with the nanowires, the polyurethane coating is added in an amount of from about 65 to about 85 weight percent.

17. The method of claim 13, wherein, in the step of dispersing the nanowires in isopropyl alcohol, the metal-containing nanowires are dispersed in the isopropyl alcohol by sonicating the nanowires.

18. The method of claim 13, wherein, in the steps of mixing the contents of the container, the contents of the container are mixed by ultrasonicating the contents.

19. The method of claim 13, wherein the resulting translucent conductive coating comprises a sheet resistance ranging from about of about $10^3$ to about $10^6$ ohms/square.

20. The method of claim 13, wherein, in the step of adding an amount of poly(3,4-ethylenedioxythiophene) poly(styrenesulfonate) solution to the container to obtain a mixture, poly(3,4-ethylenedioxythiophene) poly(styrenesulfonate) solution is added in an amount of from about 15 to 35 weight percent.

\* \* \* \* \*